Patented July 24, 1951

2,561,422

UNITED STATES PATENT OFFICE 2,561,422

PROCESS OF EXTRACTING IRON FROM CLAY

Hubert A. Shabaker, Media, Pa., assignor to Houdry Process Corporation, Wilmington, Del., a corporation of Delaware No Drawing. Application September 16, 1947, Serial No. 774,439

13 Claims. (Cl. 252—450)

The present invention relates to improved methods of treating clay for the preparation therefrom of active contact masses particularly useful as catalysts in hydrocarbon conversion processes.

In copending applications Serial Nos. 644,423 and 681,426 (filed jointly in the names of myself, George Alexander Mills and Ruth C. Denison) now U. S. 2,466,048 and U. S. 2,466,052, methods are described for the production of contact masses providing catalysts of unique properties, by treatment of clays with sulfiding gases at elevated temperature followed by the removal of the iron sulfide thus formed. The novel contact masses thus obtained are changed in physical and chemical properties and demonstrate important advantages as catalysts including exceptional stability in cracking or treating petroleum stocks of high sulfur content. By the present invention further improvements in these described methods of clay treatment are provided, affording important advantages in the practical operation thereof from the standpoint of efficiency and economy of operation, resulting more consistently and uniformly in ultimate products of desired quality.

These advantages are obtained, in accordance with one aspect of the present invention, by the use of a hot gaseous carrier medium for the dilution of the active sulfiding gas, and by utilizing the sensible heat content of the gaseous carrier for heating up the clay to and maintaining the same as desired treating temperature. The gaseous heat carrier, moreover, serves as a heat transfer medium levelling out any changes in temperature that might tend to occur as a result of exothermic or endothermic reactions taking place, thereby providing better control to maintain uniformity in desired temperature conditions during treatment of the clay. Only a small amount of sulfiding gas is theoretically required for reaction with the iron content of the clay being treated, but it is prefered to employ several times that amount, as will hereinafter appear. By using the thus diluted sulfiding gas, it has been found, not only is waste of comparatively more expensive active sulfiding gas avoided and extensive corrosion of the treating apparatus by sulfides at these high temperatures greatly diminished, but the operation further provides a thorough and rapid flushing of undesirable reaction and/or calcination products from the treated clay. In addition, the removal, as by acid leaching of the iron sulfides formed, is surprisingly facilitated. Accordingly, better control of the sulfidation reaction is afforded, and more uniform production of products of superior quality assured.

In effecting reaction between the iron present in clays with a sulfiding gas only a small quantity of the gas is theoretically required. For instance, if hydrogen sulfide is utilized as the sulfiding agent, the reaction may be postulated in accordance with either of the following equations:

I. 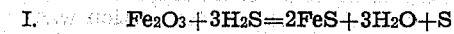 $Fe_2O_3 + 3H_2S = 2FeS + 3H_2O + S$
II. $Fe_2O_3 + 3H_2S = Fe_2S_3 + 3H_2O$ or if carbon disulfide is employed, the reaction may be postulated in accordance with the following:

III.  $2Fe_2O_3 + 3CS_2 = 4FeS + 3CO_2 + 2S$
IV. 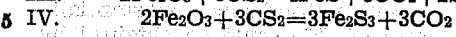 $2Fe_2O_3 + 3CS_2 = 3Fe_2S_3 + 3CO_2$ In the above equations, it is assumed that the iron content of the clay is present largely in ferric condition, which will serve adequately as a basis for discussion. The weight ratio of $H_2S/Fe_2O_3$ is the same in both Equations I and II, being 0.64/1.0; therefore the theoretical amount of $H_2S$ required may be taken as 0.64 pound of $H_2S$ per pound of $Fe_2O_3$ in the clay. This quantity of $H_2S$ is far from sufficient to heat the clay to the desired treating temperature, say to 1350–1450° F., wherefore amounts of $H_2S$ far in excess of that required to react with the iron content of the clay would have to be employed to bring the clay to the required high temperature of treatment.

It has been found that about 1000 to 1300 volumes of gas (based on air) are required to heat one volume of clay from room temperature to 1400° F., considering a pelleted clay, such as an acid-activated montmorillonite clay, weighing about 45 pounds per cubic foot. With such clay containing 2.0% $Fe_2O_3$, the theoretical requirement of $H_2S$ would be 0.576 pound, or only about 6.5 cubic feet of $H_2S$ per cubic foot of clay. In the case of $CS_2$ (Equations III and IV above) the weight ratio of $CS_2/Fe_2O_3$ in either equation is 0.715/1.0, which can be taken as the minimum theoretical amount of $CS_2$ required to sulfide all the iron in the clay, which again would be insufficient to provide the amount of gas required for heating the clay.

In accordance with the invention, the gaseous carrier medium provides the heat for bringing the clay to desired temperature for the sulfiding reaction, so that other means of preheating the clay are unnecessary, while only a small amount of the active sulfiding gas is used to effect the sulfidation of the iron.

In the selection of the gaseous carrier as the heating medium, consideration must be given to its composition and properties. The carrier gas must be essentially inert; that is, it must be free from oxidizing constituents which would consume the active sulfiding gas, and also free from other constituents in amounts which would interfere with the sulfidation reaction or be harmful to the catalyst. Commercial nitrogen is an example of a gas fulfilling these requirements, and has been successfully employed in accordance with the invention.

Another essentially inert heat carrier gas, which is comparatively cheap and readily made available, is a specially processed or prepared flue gas, which may be obtained for instance by the controlled combustion of a fuel. Gaseous fuels are preferred because of easier control of combustion; examples of such gaseous fuels which may be burned to provide flue gas include propane, and commercial heating gas. Such flue gases from commercial propane, for instance, can be readily prepared free of oxygen, but would then contain components such as water vapor, $CO_2$, and generally small amounts of CO and $H_2$ in addition to nitrogen. It was found that the presence of substantial amounts of water vapor or large amounts of $CO_2$ in the treating gas at the elevated temperature of treatment of the clay was deleterious, in that the sulfiding action was impeded and catalysts of lower activity were obtained.

Flue gas, however, can be processed to modify or substantially reduce or remove the interfering and deleterious constituents. For instance, water vapor can be removed by drying the gas over desiccants or selective absorbents. Substantially complete removal of $CO_2$ could be obtained by caustic washing. A more attractive and less expensive process effecting removal of $CO_2$ to below deleterious concentrations, as down to about 1% $CO_2$, is available in the "Girbirtol" amine process. In accordance with this process the flue gas is passed in countercurrent relationship to a suitable amine, such as ethanolamine, at conditions of temperature and rate of flow such that the acid gas is completely stripped from the other gases by reaction with the amine solution, by the formation of a compound which is subsequently dissociated by the application of heat. For example, the amine solution enters an absorber near the top and flows in countercurrent relation to the rising gas, absorbing carbon dioxide in its downward passage, with purified gas emerging from the top of the absorber. The rich amine solution containing the removed acid gas is transferred to a reactivator, which may be similar to a packed tower, in which the rich solution is directly or indirectly heated as it flows through the tower and the dissociated acid gas is stripped from the hot amine solution as with steam. Details of this process are described in U. S. Patent Re. 18,958.

Experiments conducted using gaseous carriers having the composition of a dried, Girbirtol-treated flue gas, demonstrated this composition to be successful as a heating carrier gas for sulfiding gas such as $H_2S$. Another aspect of the present invention, therefore, involves the use as a carrier for sulfiding gas of a specially processed flue gas substantially free from oxidizing constituents and water vapor and containing not more than about 5% by volume of $CO_2$.

Although the described "Girbirtol" process for the removal of $CO_2$ from flue gas is less costly than other methods such as caustic wash, the use of such procedure still introduces an item of expense which might desirably be eliminated. I have further discovered that the step of removing $CO_2$ from the flue gas need not be practiced and the process of the invention considerably simplified by overcoming the inhibiting effect of the $CO_2$ on the sulfiding operation. This can be accomplished, in accordance with a preferred aspect of the present invention, by the use of somewhat larger amounts of sulfiding gas, as in excess of twice the stoichiometric equivalent required to react with the iron content of the clay. To readily obtain the desired low residual iron content on subsequent acid leaching with diluted sulfiding gas containing in the order of about 10 to 15% $CO_2$, there should be employed an amount of active sulfiding gas of at least about 3 to 4 times the stoichiometric equivalent of the iron content of the clay. Acceptable results are generally obtained if the volume ratio $CO_2/H_2S$ does not exceed about 10. Higher concentrations of sulfiding gas may be employed, but no particular advantages are obtained in using quantities of sulfiding gas in excess of about 10% by volume concentration in the inert heat carrier gas, while amounts over 25% may sacrifice certain of the advantages of the present invention, such as low cost of gas, inhibition of the corrosive effect, and particularly the facility of subsequent acid leaching assuring uniform production of catalysts of superior qualities.

It will be seen from the foregoing, that the composition of the treating gas, including the concentration of active sulfiding agent as well as the kind and quantity of constituents in the gaseous carrier medium are important in obtaining modified clays providing catalysts of high activity and other desired physical and chemical properties. Oxygen and water vapor should best be eliminated or reduced to insignificant quantities as to the order of less than 0.1 volume percent; although water vapor up to about 2 to 3% by volume of total treating gas may be tolerated. Nitrogen in substantially pure form, as has already been indicated, or in admixture with certain other gaseous constituents non-reactive with clay components provides a suitable inert heat carrier medium. Carbon dioxide, on the other hand is undesirable in the carrier gas in large amounts. When used alone, or as a constituent of a carrier gas containing 10% or more $CO_2$ and only small amounts of sulfiding gas, less than twice the theoretical amount required to react with the iron content of the clay, there was not obtained on subsequent acid leaching of the clays investigated, catalysts of the desired low iron content. Small amounts of CO in the nitrogenous carrier gas (as below about 5% by volume) were not found to have any definite interfering effect and there were indications that the presence of CO may even be beneficial, particularly when there was present an amount of active sulfiding gas in excess of twice the theoretical iron equivalent. Hydrogen was found to have a retarding action on very dilute concentrations of $H_2S$ in the treating gas, but was less pronounced as the $H_2S$ concentration was increased, with no significant retarding effect observed when the quantity of $H_2S$ was raised to the order of about 2 or more mol percent, provided the quantity of $H_2$ was not too great as will hereinafter appear. Small amounts of $CO_2$ present in the nitrogenous gas, however, as in the order of 1 to 2 volume percent, did not have any noticeable adverse effect. Moreover, it was found that the inhibiting action of $CO_2$ present in the gas in the order of above about 10% by volume, could be essentially corrected by the use of larger quantities of active sulfiding gas as has already been pointed out. Here too, the presence of small amounts of CO as in the range of 0.5 to 5 volume percent may be beneficial in tending to overcome the inhibitory effect of the $CO_2$ on the sulfidation reaction. Thus, a flue gas containing about 11 to 13 volume percent $CO_2$ can be successfully employed if the proper quantity of active sulfiding gas is used. Addition of CO to the mixture tends to diminish the retarding action of the $CO_2$ but in the presence of $H_2$ very little effect is apparently exerted by the CO. The amount of $H_2$ in the mixture is of major importance. One or two percent of $H_2$ added to a gaseous composition comprising $N_2$, $CO_2$, and CO does not appear to exert much retarding action, but larger amounts of $H_2$ exert rapidly increasing retarding effect, decreasing with higher $H_2S$ contents. In all cases the retarding effects of the $CO_2$, CO, and $H_2$ mixtures are decreased as the amount of $H_2S$ is increased. Thus, all retarding effects are in the direction of lower $H_2S$ to $CO_2$, CO, and $H_2$ ratios.

In the carefully controlled combustion of a gas such as propane for the production of a suitable flue gas, a gas-air mixture which would insure less than 0.1% $O_2$ in the flue gas would also produce about 0.5% CO and some $H_2$ in the flue gas. The CO and $H_2$ content of the flue gas can be increased within limits by proper control of the air-propane mixture. To get essentially 0% oxygen in the flue gas from the burning of propane, the flame must be held slightly on the reducing side which results in the formation of about 0.5% CO. At this concentration of CO the probable $H_2$ content will be about 2.5% and that of $CO_2$ about 12%, all on a volume basis. The proportions of $CO_2$, $H_2$, CO and $H_2O$ in a flue gas are determined by the theoretical equation $$CO_2 + H_2 = CO + H_2O$$

which in accordance with the law of mass action would be governed by an equilibrium constant at any particular temperature. It has been calculated that in the equilibrium formula $$K = \frac{(CO_2)(H_2)}{(CO)(H_2O)}$$

the constant K has a value of 1.33 at 1400° F., and that the equilibrium gas composition at this temperature would be 10.1 volume percent $CO_2$, 0.6 volume percent $H_2$, 2.4 volume percent CO, and 1.9 volume percent $H_2O$. This amount of water in the carrier gas was either insufficient to produce any marked deactivation of the catalyst (although it was found that 5% $H_2O$ materially reduces catalytic activity at the high treating temperature) or that equilibrium was not reached in the gas mixture in the time of passage through the bed of clay, so that the deactivation effect of the less than equilibrium amount of water which was formed was comparatively insignificant or within the limits of experimental error in measurement and testing of catalyst activity.

It has already been indicated above, that by the use of the diluted sulfiding gas, the formed iron sulfide was more easily removed by subsequent acid leaching, whereas in the case of 100% $H_2S$ or other high concentrations of sulfiding gases, the completeness of acid leaching to remove the iron sulfide was often erratic and unpredictable. With the diluted gas, containing less than about 25% by volume of active sulfiding gas, uniformly successful leaching was readily obtained at room temperature.

It is indicated in the prior applications that catalysts of advantageously improved properties are obtained by sulfiding with $H_2S$ at about 1200° F. and up to short of the temperatures causing incipient fusion or rapid shrinkage of the clay; somewhat higher temperatures are indicated for $CS_2$, as above about 1300° F. These conditions apply in the use of diluted sulfiding gas, with optimum results being obtained with most clays investigated generally in the range of about 1350–1450° F.; 1400° F. being found a convenient and safe operating temperature. The temperature limits for any particular clay are fixed by catalyst activity on the one hand and residual iron content on the other; too low a temperature resulting in inefficient sulfidation and by too high a temperature of sulfidation catalysts of reduced activity are obtained.

In the indicated temperature range, the rate of gas introduction should be controlled to provide for sufficient time to heat the catalyst to desired treating temperature and provide sufficient time for the sulfidation reaction. Employing dried flue gas containing an amount of sulfiding gas of about 3 times the theoretical equivalent of iron in the clay to overcome the inhibiting effect of $CO_2$ and other constituents (84.1% $N_2$, 11.5% $CO_2$, 2.5% $H_2$, 0.5% CO and 1.4% $H_2S$, all by volume), the iron content of an acid activated montmorillonite clay (originally 2.1% $Fe_2O_3$) was reduced to below 0.2% $Fe_2O_3$ by a 5 hour treatment (followed by acid leaching), whereas in a 2½ hour treatment using a treating gas of the same composition the residual iron content of the clay after acid leaching was about 0.32%. With somewhat higher concentrations of active sulfiding gas, catalysts of less than 0.2 to 0.1% $Fe_2O_3$ are obtained in shorter time.

Notwithstanding that is has twice the sulfur atom content per mol, $CS_2$ is a less effective sulfiding agent than $H_2S$ for equivalent weight or mol concentrations of gas. As the concentration of the sulfiding agent is increased to about 3 volume percent and at temperature in excess of about 1300 to 1350° F., however, the difference is largely wiped out. As a general rule, the same volume concentrations of $CS_2$ may be employed as has already been indicated in connection with $H_2S$ as the sulfiding agent.

EXAMPLE I

The clay treated in this example was a commercial acid-activated montmorillonite clay (Filtrol), having the following analysis on a dry (105° C.) basis; in some of these experiments the clay employed was previously washed with water to remove sulfates. This step did not appear to have any material effect on the ultimate results obtained by the invention.

|  | Parts by weight | |
| --- | --- | --- |
|  | Unwashed | Washed |
| Loss (@ 1600° F.) | 8.51 | 7.84 |
| Si as $SiO_2$ | 64.4 | 67.8 |
| Al as $Al_2O_3$ | 15.64 | 16.5 |
| Fe as $Fe_2O_3$ | 1.83 | 2.19 |
| Na as $Na_2O$ | .06 |  |
| Ca as CaO | 2.72 | 1.26 |
| Mg as MgO | 4.30 | 4.32 |
| $SO_4$ | 4.25 | 0.14 |

(a) The clay was ground, admixed with water to suitable consistency and extruded as pellets of 4 mm. diameter and 4 mm. lengths. The pellets were dried and then variously treated as shown below. The iron content of the final catalyst in each instance was determined as well as its activity in the cracking of hydrocarbons (after calcination in air at 1050° F. for 2 hours); the results being shown in Table 1 below.

(b) A portion of the pellets were treated at 1400° F. for 5 and 8 hours respectively with a gas mixture comprising 99.18% nitrogen and 0.82% $H_2S$ (by vol.), subsequently permitted to cool and treated with 15% aqueous HCl solution for 24 hours at room temperature, followed by washing in water and drying.

(c) Another portion of the pellets from (a) above was treated at 1400° F. for 5 hours with hydrogen sulfide in various concentrations carried in a nitrogenous gas comprising or simulating a processed flue gas free from water but of different content of $CO_2$, $H_2$, and $CO$. The sulfided pellets were then acid leached as in the preceding paragraph. The effects of varying the concentration of the sulfiding gas and the composition of the carrier gas is shown in Table 1 below.

(d) For comparison, other treatments of the pelleted catalyst were conducted at 1400° F. for 5 hours with hydrogen sulfide carried in dry carbon dioxide gas and (e) with nitrogenous gas containing water; likewise followed by acid leaching. These results are also tabulated in Table 1.

deposited on the catalyst is determined by conversion to $CO_2$ and expressed in weight percent of charge. The gravity (referred to air) of the gaseous by-products is also determined and the weight percent of gas calculated from the measured volume and gravity.

A number of the experiments shown in Table 1 were repeated with variations in duration of treatment (at 1½, 2½, and 10 hours) and in temperature of treatment (at intervals from 1300 to 1475° F.). These experiments showed that for the particular clay and the treating conditions employed that optimum results are obtained in the range of about 1350 to 1450° F., and that the shorter treatment can be employed with equal effect as the concentration of sulfiding gas is increased. To assure the consistent production of catalysts having less than 0.2% residual $Fe_2O_3$ larger quantities and higher concentrations of $H_2S$ should be employed as above 2.5 mol percent $H_2S$ in the mixture, or providing more than 3 times the equivalent of iron present.

A number of the experiments were repeated with other acid activated montmorillonite clays and with other available clays having 2 to over 5% $Fe_2O_3$. Although there were individual quantitive variations, in all instances the results confirmed the previous experiments. Although for any particular clay somewhat larger or smaller quantities of sulfiding gas may be re-

*Table 1*

| | Treating Gas Comp., Vol. percent | | | | | | Wt. ratio $H_2S/Fe_2O_2$ | Finished Catalyst "Cat-A" Activity | | | | Residual Iron in Leached Clay Calc. as Wt. Per Cent $Fe_2O_3$ |
|---|---|---|---|---|---|---|---|---|---|---|---|---|
| | $N_2$ | $CO_2$ | $H_2O$ | $H_2$ | $CO$ | $H_2S$ | Hrs. | | Gaso., Vol. Per Cent | Coke, Wt. Per Cent | Gas, Wt. Per Cent | Grav. Gas | |
| b | 99.18 | | | | | 0.82 | 8 | 0.80 | 38.0 | 3.6 | 9.2 | 1.50 | 0.35 |
| | 99.18 | | | | | 0.82 | 8 | 1.33 | 37.3 | 3.4 | 8.7 | 1.50 | 0.22 |
| | 99.18 | | | | | 0.82 | 5 | 0.83 | 39.3 | 4.0 | 10.6 | 1.46 | 0.27 |
| | 97.6 | | | 1.0 | | 1.4 | 5 | 1.85 | 39.0 | 3.0 | 7.2 | 1.55 | 0.20 |
| | 96.1 | 1.1 | | 1.0 | 1.1 | 0.7 | 5 | 0.83 | 38.4 | 3.1 | 8.0 | 1.36 | 0.24 |
| | 85.1 | 11.7 | | | 2.5 | 0.7 | 5 | 0.83 | 37.1 | 3.5 | 9.1 | 1.51 | 0.32 |
| | 85.8 | 11.8 | | | 1.0 | 1.4 | 5 | 1.65 | 38.0 | 3.3 | 9.0 | 1.48 | 0.25 |
| c | 81.7 | 11.2 | | 0.9 | 4.9 | 1.4 | 5 | 1.65 | 37.3 | 3.4 | 9.2 | 1.45 | 0.27 |
| | 85.9 | 11.8 | | 0.9 | | 1.4 | 5 | 1.65 | 36.5 | 3.0 | 7.0 | 1.5 | 0.25 |
| | 84.5 | 11.6 | | 2.5 | 0.5 | 1.4 | 5 | 1.65 | 37.4 | 2.9 | 7.9 | 1.47 | 0.27 |
| | 83.4 | 11.5 | | 2.5 | 0.5 | 2.1 | 5 | 2.50 | 39.1 | 3.3 | 8.9 | 1.50 | 0.22 |
| | 84.4 | 11.6 | | 0.9 | 1.0 | 2.1 | 5 | 2.50 | 38.4 | 3.0 | 7.2 | 1.55 | 0.26 |
| d | | 99.26 | | | | 0.74 | 5 | 0.83 | 33.0 | 4.2 | 7.4 | 1.09 | 1+ |
| e | 81.0 | 11.3 | 5.0 | 1.0 | 1.0 | 0.7 | 5 | 0.83 | 34.1 | 3.9 | 11.1 | 1.22 | 0.75+ |

While the above treated catalysts under (b) and (c) above showed gasoline yields in cracking of a light gas oil under standard conditions of 37–39% by volume of the charge, when the nitrogenous gas was substituted by $CO_2$ (d) or when as much as 5% $H_2O$ was present in the treating gas (e) not only was iron removal impeded, but the resulting catalysts showed reduction in gasoline activity and comparatively high coke at the particular level of activity.

The gasoline yields shown in the above table and elsewhere herein referred to are those obtained by the CAT-A method, described by H. G. Shimp and J. A. Alexander in National Petroleum News, Technical Section, August 2, 1944, at page R-537. In accordance with the described test, a standard light East Texas gas oil is cracked at 800° F. and atmospheric pressure at a liquid space rate per hour of 1.5 during a period of ten minutes. The yield of motor gasoline (410° F. cut point) distilled from the liquid products is measured and the activity of the catalyst designated in terms of the volume per cent of such gasoline yield to the volume of oil charged. The "coke"

quired in practice for best results, the indicated quantities should be found generally applicable.

EXAMPLE II

The clay treated in this example was from a different lot of commercial acid-activated montmorillonite clay having the following analysis on a dry (105° C.) basis:

| | |
|---|---|
| Ing. loss (@ 1600° F.) | 9.2 |
| Si as $SiO_2$ | 64.4 |
| Al as $Al_2O_3$ | 14.3 |
| Fe as $Fe_2O_3$ | 1.57 |
| Na as $Na_2O$ | 0.11 |
| K as $K_2O$ | 0.20 |
| Ca as CaO | 2.66 |
| Mg as MgO | 5.56 |
| $SO_4$ | 4.18 |

(a) Pellets were prepared by extrusion of the above clay in the same manner as described in Example I, paragraph (a).

(b) The above pellets were treated for 5 hours at 1400° F. with various carbon disulfide compositions in an essentially inert carrier gas followed by acid leaching, with the results shown in the following table:

Table 2

| Treating gas comp., vol. per cent | | | | | | Wt. ratio $CS_2/Fe_2O_3$ | Residual iron in leached clay as Wt. per cent $Fe_2O_3$ |
|---|---|---|---|---|---|---|---|
| $N_2$ | $CO_2$ | $H_2O$ | $H_2$ | CO | $CS_2$ | | |
| 83.0 | 11.3 | ------ | 2.4 | 0.5 | 2.8 | 84 | 0.18 |
| 82.0 | 11.4 | ------ | 2.4 | 0.5 | 3.7 | 11.1 | 0.14 |
| 77.1 | 10.6 | ------ | 2.3 | 0.4 | 9.4 | 28.2 | 0.10 |

For comparison, pellets of the same clay were treated for 2 hours at 1400° F. with $H_2S$ diluted in nitrogen in an amount giving a weight ratio of $H_2S/Fe_2O_3$ of 10.3 (75% $N_2$–25% $H_2S$), followed by acid leaching; the resulting catalyst contained 0.1% $Fe_2O_3$.

In employing flue gas as the heat carrier medium, the composition of the gas may be controlled by the amount of air supplied in burning the fuel. The limits will be more or less fixed in order to obtain a minimum of free oxygen in the flue gas on the one hand, and for limiting the quantity of uncombined hydrogen on the other. In using commercial propane as a fuel, for instance, suitable flue gas for use in accordance with the invention may be obtained by controlling combustion so as to obtain in the flue gas about 0.5 to 3% hydrogen. Under these conditions there will be formed approximately 1.0 to 4.5% CO, 11 to 13% $CO_2$, the balance of 85 to 81.5% being chiefly nitrogen, which may contain very small amounts of other inert gases.

Thus, a flue gas was prepared, by burning propane and drying, containing (by volume) 1.3% $H_2$, 1.6% CO, 12.7% $CO_2$, 0.02% $O_2$, the remaining about 84.4% being essentially $N_2$. To this gas was added 2.1 volume percent $H_2S$ and employed for sulfidation of clays as illustrated in the following example:

EXAMPLE III

A pelleted acid treated sub-bentonite clay containing 1.34% $Fe_2O_3$ (dry basis) was treated with a sulfiding gas of the composition above described at 1350–1400° F. for 4 hours, then leached with dilute hydrochloric acid at room temperature, washed and dried. The final catalyst contained 0.15% $Fe_2O_3$ and showed a cracking activity by the CAT–A method of 39.6 volume percent gasoline, 3.3 weight percent coke and 9.4 weight percent gas of 1.65 gravity.

Although nitrogenous gases of the composition hereinbefore described are readily and economically obtained from flue gas, it will be understood that the invention is not limited to any particular source or manner of obtaining essentially inert gaseous carriers of the composition described.

Obviously many modifications and variations of the invention as hereinbefore set forth may be made without departing from the spirit and scope thereof and therefore only such limitations should be imposed as are indicated in the appended claims.

I claim as my invention:

1. In processes for the beneficiation of iron-containing clays by methods involving the steps of sulfidation of a clay at elevated temperature followed by acid leaching, the improvement which comprises heating the clay to such elevated temperature by contact with hot treating gas composed of an active sulfiding gas and a predominant quantity of an essentially inert gaseous carrier composed chiefly of nitrogen, said treating gas being free from water in excess of 5% by volume and free from substances reacting to form water in excess of said amount of water under the treating conditions, said treating gas being further free from $CO_2$ in excess of 15% by volume.

2. The improvement defined in claim 1 in which said treating gas contains carbon dioxide in an amount less than that giving a volume ratio of $CO_2/H_2S$ above 10.

3. The improvement defined in claim 1 in which said treating gas comprises less than 10% by volume of carbon dioxide.

4. The improvement defined in claim 1 in which said essentially inert gaseous carrier contains small amounts of at least one gas from the group consisting of hydrogen and carbon monoxide, not in excess of 3% hydrogen and 5% carbon monoxide by volume of said treating gas.

5. The improvement as defined in claim 1 in which said essentially inert gaseous carrier is flue gas obtained by the controlled combustion of a gaseous fuel so that the flue gas is substantially free of uncombined oxygen.

6. The improvement defined in claim 1 in which said treating gas comprises 0.5 to 25% by volume of hydrogen sulfide as the active sulfiding gas.

7. The improvement defined in claim 1 in which said treating gas contains over 90% by volume of nitrogen.

8. The process according to claim 1 in which said active sulfiding gas is carbon disulfide.

9. The process of preparing improved catalysts from iron-containing clay, which comprises treating said clay at elevated temperature with a mixture of gases comprising an essentially inert gaseous carrier and 0.5 to 25% hydrogen sulfide and thereafter acid leaching the thus sulfided clay, said mixture of gases containing predominantly nitrogen being free from $CO_2$ in excess of 15% by volume and being free from water in excess of 5% by volume and being also free from substances reacting to form water in excess of said amount of water under the treating conditions.

10. The process of preparing improved catalysts from clay containing iron compounds, which comprises treating said clay with a diluted sulfiding gas at a temperature above 1200° F. for a time sufficient to convert the iron compounds to sulfides, said diluted sulfiding gas comprising as an essentially inert gaseous heat carrier dried flue gas substantially free from uncombined oxygen, and being also free from carbon dioxide in excess of 15% by voume of the total gaseous mixture, and thereafter subjecting the sulfided clay to treatment to remove iron sulfides formed.

11. The process of preparing improved catalysts which comprises subjecting an acid-treated montmorillonite clay containing iron compounds to sulfidation at a temperature of 1350–1450° F. with a sulfiding gas selected from the group consisting of carbon disulfide and hydrogen sulfide, diluted with an essentially inert carrier gas comprising predominantly nitrogen, and thereafter acid leaching the thus sulfided clay; said treating gas being free from water in excess of 5% by volume and free from substances reacting to form water in excess of said amount of water under the treating conditions, said treating gas being further free from $CO_2$ in excess of 15% by volume.

12. The process of claim 11 in which the sulfiding gas composition including the essentially inert carrier gas comprises by volume: 0.5 to 25% hydrogen sulfide, carbon dioxide in an amount less than 15%, up to 5% carbon monoxide, the balance of the composition being made up chiefly of nitrogen.

13. The process of claim 11 in which said essentially inert carrier gas comprise 0.5 to 3.0% hydrogen, 1.0 to 4.5% CO, 11 to 13% $CO_2$, the balance of the composition being essentially nitrogen.

HUBERT A. SHABAKER.

REFERENCES CITED

The following references are of record in the file of this patent:

UNITED STATES PATENTS

| Number | Name | Date |
| --- | --- | --- |
| 1,727,441 | Parentani | Sept. 10, 1929 |
| 2,205,409 | Houdry | June 25, 1940 |
| 2,388,302 | Weyl | Nov. 6, 1945 |
| 2,456,326 | Rupp et al. | Dec. 14, 1948 |
| 2,466,048 | Shabaker et al. | Apr. 5, 1949 |
| 2,466,052 | Shabaker et al. | Apr. 5, 1949 |

Certificate of Correction

Patent No. 2,561,422

July 24, 1951

HUBERT A. SHABAKER

It is hereby certified that error appears in the printed specification of the above numbered patent requiring correction as follows:

Column 1, line 32, for "as" read *at*; column 2, line 15, for that portion of the equation reading "$3Fe_2S_3$" read *$2Fe_2S_3$*; column 6, line 41, for "is has" read *it has*; columns 7 and 8, Table 1, ninth column thereof, in the heading, for that portion reading "$H_2S/Fe_2O_2$" read *$H_2S/Fe_2O_3$*; column 9, Table 2, column seven thereof, line 3, for "84" read *8.4*; column 10, line 59, for "voume" read *volume*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*